(12) United States Patent
Svahn et al.

(10) Patent No.: US 10,232,433 B2
(45) Date of Patent: Mar. 19, 2019

(54) CASTING MOLD AND A METHOD FOR DETECTING A TEMPERATURE DISTRIBUTION OF MOLTEN METAL IN A CASTING MOLD

(71) Applicant: ABB Schweiz AG, Baden (CH)

(72) Inventors: Conny Svahn, Västerås (SE); Jan-Erik Eriksson, Västerås (SE); Martin Sedén, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/748,402

(22) PCT Filed: Jun. 28, 2016

(86) PCT No.: PCT/EP2016/064988
§ 371 (c)(1),
(2) Date: Jan. 29, 2018

(87) PCT Pub. No.: WO2017/032488
PCT Pub. Date: Mar. 2, 2017

(65) Prior Publication Data
US 2018/0214937 A1 Aug. 2, 2018

(30) Foreign Application Priority Data
Aug. 21, 2015 (WO) ............... PCT/EP2015/069244

(51) Int. Cl.
*B22D 11/18* (2006.01)
*B22D 11/20* (2006.01)
(Continued)

(52) U.S. Cl.
CPC ............ *B22D 11/182* (2013.01); *B22D 2/006* (2013.01); *B22D 11/20* (2013.01); *G01K 11/3206* (2013.01)

(58) Field of Classification Search
CPC .......................... B22D 11/182; B22D 11/202
See application file for complete search history.

(56) References Cited

U.S. PATENT DOCUMENTS

| 8,939,191 B2 | 1/2015 | Arzberger et al. |
| 2011/0167905 A1 | 7/2011 | Arzberger et al. |
| 2011/0186262 A1* | 8/2011 | Schulze ................ B22D 2/006 164/151.4 |

FOREIGN PATENT DOCUMENTS

| DE | 102008060507 A1 | 1/2010 |
| DE | 102009049479 A1 | 12/2010 |

(Continued)

OTHER PUBLICATIONS

Thomas B G et al: "Implementation of temperature and strain micro-sensors into a casting mold surface", TMS Annual Meeting (Sensors, Sampling, and Simulation for Process Control—Held During the TMS 2011 Annual Meeting and Exhibition, Jan. 1, 2011 (Jan. 1, 2011) pp. 127-134.

(Continued)

*Primary Examiner* — Kevin E Yoon
(74) *Attorney, Agent, or Firm* — Whitmyer IP Group LLC

(57) ABSTRACT

A casting mold including a copper plate and a plurality of optical fibers, having a plurality of temperature measuring points for the copper plate while casting. Molten metal is cast into the mold along an axis of, the optical fibers built-in the plate. A method for detecting temperature distribution of a molten metal in a casting mold having at least one copper plate, including determining by calculation or measurement an ideal molten flow of the metal, building-in a plurality of optical fibers into the copper plate based on flow, arranging the optical fibers inside at least the upper part of the copper plate, receiving the measurements of temperatures, and (Continued)

comparing the measurements of temperatures with a calculated/measured distribution of an ideal molten flow.

9 Claims, 6 Drawing Sheets

(51) Int. Cl.
  *B22D 2/00* (2006.01)
  *G01K 11/32* (2006.01)

(56) References Cited

FOREIGN PATENT DOCUMENTS

| DE | 102009060548 | A1 | | 6/2011 | |
|---|---|---|---|---|---|
| DE | 102013224977 | A1 | | 4/2015 | |
| JP | 56-095461 | A | | 8/1981 | |
| JP | S5695461 | A | | 8/1981 | |
| JP | 57081941 | A | * | 5/1982 | ........... B22D 11/204 |
| JP | 57088956 | A | * | 6/1982 | |
| JP | S61219456 | A | | 9/1986 | |
| JP | H01210160 | A | | 8/1989 | |
| JP | H04351254 | A | | 12/1992 | |
| JP | H0847762 | A | | 2/1996 | |
| JP | H08159883 | A | | 6/1996 | |
| JP | H0947855 | A | | 2/1997 | |
| JP | H0985406 | A | | 3/1997 | |
| JP | 2008043981 | A | | 2/2008 | |
| JP | 2008260046 | A | | 10/2008 | |
| JP | 2011527417 | A | | 10/2011 | |
| WO | 2010003632 | A1 | | 1/2010 | |

OTHER PUBLICATIONS

International Preliminary Report on Patentability Application No. PCT/EP2016/064988 Completed Date: Nov. 6, 2017 7 pages.
International Search Report & Written Opinion of the International Searching Authority Application No. PCT/EP2016/064988 Completed Date: Aug. 22, 2016; dated Aug. 30, 2016 15 pages.
Written Opinion of the International Preliminary Examining Authority Application No. PCT/EP2016/064988 dated Jul. 11, 2017 6 pages.

* cited by examiner

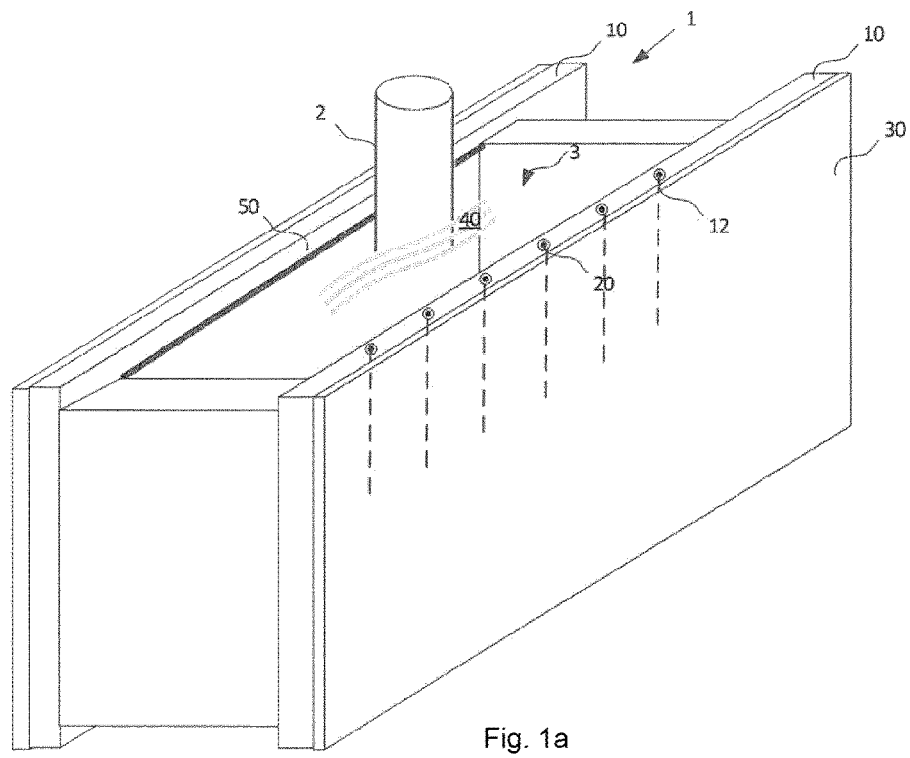
Fig. 1a
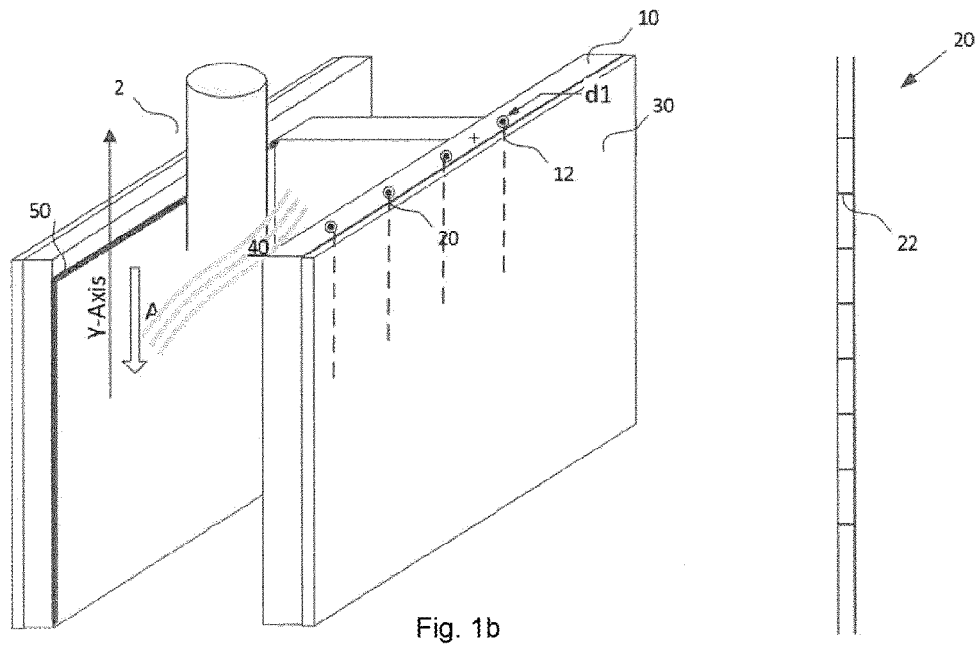
Fig. 1b
Fig. 3

CASTING MOLD AND A METHOD FOR DETECTING A TEMPERATURE DISTRIBUTION OF MOLTEN METAL IN A CASTING MOLD

TECHNICAL FIELD

The present invention relates to a casting mold comprising a copper plate and a plurality of optical fibers arranged for measuring temperature of the copper plate, each of the optical fibers having a plurality of temperature measuring points arranged for measuring temperature of the copper plate while casting. The invention also relates a method for detecting a temperature distribution of a molten metal in a casting mold having at least one copper plate.

BACKGROUND

It is well-known in the art that it is important to monitor temperature of a casting mold that is operating at a high speed.

During the casting process, a typical period of temperature variation is less than ten seconds. This is because the temperature depends on a heat flux of molten steel. The heat flux may vary depending on melt temperature, mold powder characteristics and molten steel movements. Typically the molten steel flow will change during a casting process, which results in a dynamic temperature profile of the mold. If the temperature is uniform in the molten metal surface layer the solidification is uniform over the strand width. If, on the other hand, the temperature is not uniform in the molten metal surface layer the cast surface will solidify and the risk for surface cracks, inclusion entrapment and uneven solid shell will increase. Also if the solid shell is uneven there is a risk both for lower structural strength and remelting of the solid shell that can result in a so called break-out below the mold where the shell is broken and the steel flows out causing major damage to the surrounding equipment.

Typically, the top surface of the molten steel in the mold, reveals to some extent how the molten steel flows inside the mold. As the flow speed and pattern of the molten steel is very important for the stability and homogeneity of the casting process as well as for promoting beneficial solidification and inclusion cleaning conditions, detection of the shape of the top molten steel surface is essential. A typical standing wave height of the top molten steel surface is 10 mm. In especially the later stages of a casting sequence, random clogging effects often lead to asymmetric molten steel flow patterns in the mold.

The temperature determination may be made by measuring the temperature of a copper plate of the casting mold. For measuring, determining and monitoring the temperature of the copper plate, thermocouples are mounted in holes in the copper plate. The number of the thermocouples is limited, for example up to 20 pieces due to the geometry constraints of the copper plate. Thus, the spatial resolution of measured temperatures is low.

In a recent development, optical fibers are used for measuring temperatures of a copper plate to achieve a higher resolutions of measured temperature.

US 2011/0167905 A1 describes a method comprising detecting the temperature distribution in the area of a casting level over the height of a mold by using a measuring thread and/or a measuring probe to determine the height of the casting level, where the measuring thread and/or measuring probe is detachably mounted on a copper plate of the mold and comprises fiber-optic sensors. The height of the casting level is determined from the detected temperature distribution by using an evaluation device. A further measuring probe for temperature detection may be detachably arranged in the area of the lower end of the mold.

PCT/EP2009/004901 describes another method, wherein laser light is passed through optical fibers used as sensors. Grooves are arranged made on the outer sides of copper plates of a mold. The optical fibers are located in these grooves. The fibers have a meandering arrangement in the grooves. At least two fibers are arranged in each groove. The grooves are located between cooling channels on the outside of the plates. The fibers are arranged in the fixed side, the detachable side and preferably in both narrow sides of the mold.

SUMMARY

It is an object of the present invention to achieve more accurate and increased spatial resolution temperature measurements in the mold of a continuous caster and consequently to enable a better control of a casting process and thereby achieving higher cast steel quality and higher process safety.

In a first aspect, there is a casting mold comprising a copper plate and a plurality of optical fibers, each of the optical fibers having a plurality of temperature measuring points arranged for measuring temperature of the copper plate while casting, wherein a molten metal is cast into the casting mold along an axis, wherein the optical fibers are built-in the copper plate and are arranged at least in the upper part of the copper plate so that the temperatures of at least upper part of the copper plate are measured.

During casting, the copper plate is located adjacent to a thin layer of mold flux, on the other side of which the solidifying shell and the molten steel are located. By measuring the temperature of full length of at least upper part of the copper plate, the temperatures of the solidifying shell and the molten metal can be estimated, thus important information on the casting process is thus obtained.

During a casting process, temperature in the copper plate is varying over time and position. A temperature sensing must be able to monitor these variations in order to monitor temperature distributions of the copper plate.

It is particularly of importance to monitor an upper part of the copper plate to be able at an early stage to extract information of solidifying shell inhomogeneities and deficiencies, sticker and break-out tendencies as well as variations in flow patterns, asymmetries and speeds to learn about best casting practices in relation to thermal information.

By non-detachably building/embedding the optical fibers into the copper plate, a highly robust and reliable measuring system is achieved.

In one embodiment of the invention, the optical fibers are arranged into at least the upper 300 mm of the copper plate.

In another embodiment of the invention, the optical fibers are arranged into the entire wide side and at least the upper 400 mm of the copper plate.

In a further embodiment of the invention, the optical fibers are arranged into the entire area of the copper plate, which makes it possible to collect complete information regarding the thermal changes in the entire solidification shell during casting and to learn about best casting practice in relation to thermal information.

In order to build-in the optical fibers into the copper plate, a plurality of holes are arranged in parallel and/or perpendicular with the axis of casting direction for accommodating the optical fibers. Each of the holes has a diameter of 0.3-1.2 mm. The holes may be further grouped and a distance between two groups is in a range of 100-400 mm, preferably 150-400 mm. A distance between two holes in the same group is in a range 10-100 mm, preferably 50-80 mm.

By grouping the optical fibers into groups and arranging the groups with distances, a total amount of the temperature measuring points may reach at least 500 or alternatively 1500 thus to achieve a high resolution. For achieving even higher temperature and position measuring resolution, a total amount of the temperature measuring points of at least 3000 may be arranged.

In a second aspect of the invention, there is a method provided method for detecting a distribution of a molten metal in a casting mold having at least one copper plate, wherein the molten metal is cast into the casting mold along an axis, the method comprising determining by calculation or measurement an ideal molten flow of the molten metal in the mold, building-in a plurality of optical fibers into the copper plate based on the calculated/measured actual molten flow, arranging the optical fibers inside of the copper plate at least the upper part of the copper plate, receiving the measurements of temperatures, and comparing the measurements of temperatures with a calculated/measured distribution of an ideal molten flow during ideal conditions.

In one embodiment of the invention, the method further comprising arranging a plurality of holes in parallel and/or perpendicular with the axis of the casting direction for accommodating the optical fibers.

In yet another embodiment of the invention, after receiving the measurements of temperatures and the method comprises step of determining temperature distribution of the copper plate by comparing the measured result with the ideal molten flow.

In yet another embodiment of the invention, the method further comprises continuously monitoring the measured temperature distribution in the copper plate, comparing the measured temperature distribution to a calculated/measured distribution during ideal conditions, and detecting high spatial temperature gradients based on a comparison result.

In a further embodiment of the invention, the method comprises continuously monitoring the measured temperature distribution in the upper part of the copper plate, comparing the measured temperature distribution to a calculated/measured distribution during ideal conditions, and detecting deviations of the temperature pattern on left and right sides of the mold based on a comparison result.

BRIEF DESCRIPTION OF THE DRAWINGS

The invention will now be explained more closely by the description of different embodiments of the invention and with reference to the appended figures.

FIG. 1a illustrates a side perspective schematic view of a casting mold according to a first embodiment of the invention, wherein multiple optical fibers are built-in the upper region of a copper plate of the casting mold.

FIG. 1b shows a cross-section of a casting mold of the embodiment of FIG. 1a.

FIG. 3 illustrates an optical fiber built into a copper plate of the casting mold according to FIG. 1a.

DETAILED DESCRIPTION

Figure 1C:
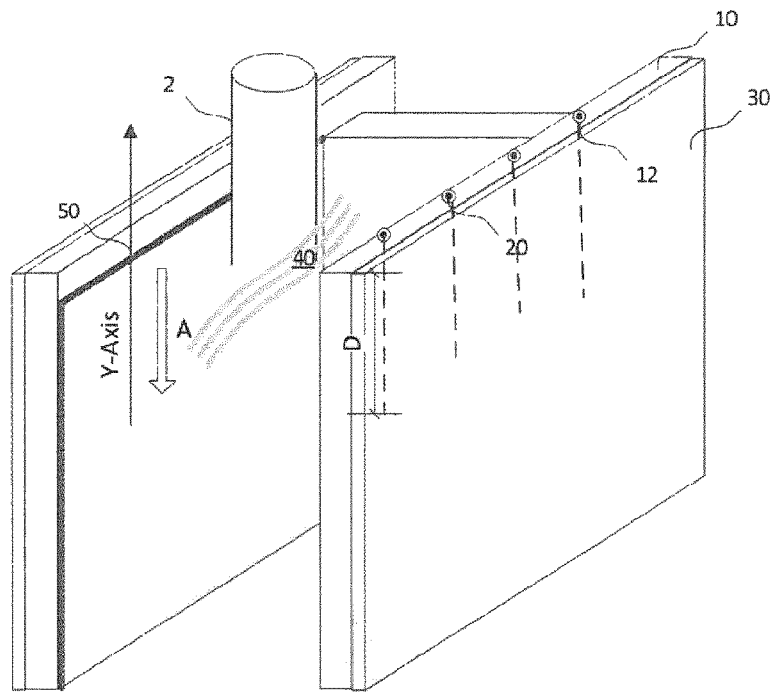
FIG. 1c illustrates a cross-section of a casting mold according to a second embodiment of the invention, wherein multiple optical fibers are vertically built-in at least 300 mm from the upper edge of the copper plate.

It should be understood that the scope of the invention must not be limited the presented embodiments, it shall cover other embodiments that are obvious to a person skilled in the art.

FIG. 1a is a side perspective view of a casting mold 1 for casting molten metal 40 such as steel, copper or aluminum. The casting mold 1 comprise a nozzle or a pouring spout 2 and a hollow cavity 3 of the desired shape. In this example, a rectangular cavity is illustrated. The cavity 3 is typically constructed in a rectangular shape with a wide side and a narrow side and further includes an external structure 30 and an interior copper plate 10. The molten metal 40 fills the cavity 3 during casting. A thin layer of mold flux 50 is formed between the molten metal and the copper plate, which may cover the entire area of the copper plate 10 and thus separates the molten metal 40 from direct contact with the interior copper plate 10.

During a casting process, the molten metal 40 is poured through the nozzle or the pouring spout 2 into the cavity 3 and solidified. The solidified part is also known as a cast strand, which is drawn out of the mold as slabs or billets. It is known that the solidification of the surface of a cast strand is determined by the temperature distribution of the molten metal in the mold.

In order to monitor the temperature distribution of the molten metal, a plurality of optical fibers 20 are fixedly built inside of the interior copper plate. Each of the optical fibers 20 having a plurality of temperature measuring/sensing points 22 arranged for measuring temperature of the copper plate. A total number of temperature measuring/sensing points 22 on each of the optical fibers 20 may be in a range of 40-100 for example. FIG. 3 illustrates an optical fiber 20 with a plurality of measuring points 22. The temperatures are measured and collected and analyzed while casting a molten metal into the casting mold along an axis Y, wherein the casting direction is denoted by arrow A. The installation of the optical fibers enables extraction of information about solid shell deficiencies, break-out tendencies and deviations in flow pattern, and therefore provides a better control of the casting process in relation thermal information. Furthermore, the fixedly built-in optical fibers 20 provides a robust and easy installation.

In FIG. 1a, the optical fibers 20 are arranged in the upper part of the copper plate so that the temperatures of at least the upper part of the copper plate are sensed and measured. To facilitate the built-in construction, a plurality of holes 12 are arranged into the copper plate 10, each of the holes 12 is configured to accommodate an optical fiber 20.

FIG. 1b shows a cross-section view of a casting mold according to one example of the invention, which shows that the holes 12 are arranged from the upper edge of the copper plate into the copper plate in parallel with the axis Y, i.e. along with a direction of the casting and the optical fibers are fixedly built into the copper plate.

FIG. 1c shows a cross-section view of another example of the invention, wherein the holes 12 are arranged in parallel with the axis Y into the copper plate at least 300 mm from the upper edge of the wide side of the copper plate for accommodating the optical fibers 20. In this example, the arrangement is applied to a copper plate that has height 900 mm, width 1850 mm and thickness 30-50 mm. However, it can be applied for other dimensions as well with proper adjustments.

Figure 1D:
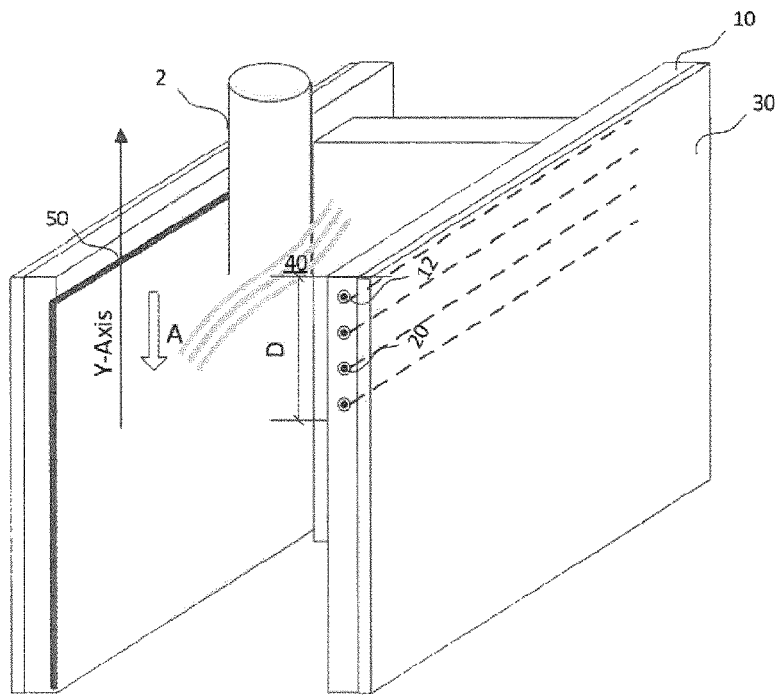
FIG. 1d illustrates a cross-section of a casting mold according to a third embodiment of the invention, wherein multiple optical fibers are horizontally built-in at least 400 mm from the upper edge of the copper plate.

Furthermore, holes 20 may be also arranged in perpendicular with the axis Y as illustrated in FIG. 1d. In this example, the holes 12 are arranged such that the optical fibers may measure a region cover the 400 mm from the upper edge and the wide side of the copper plate.

Figure 1E:
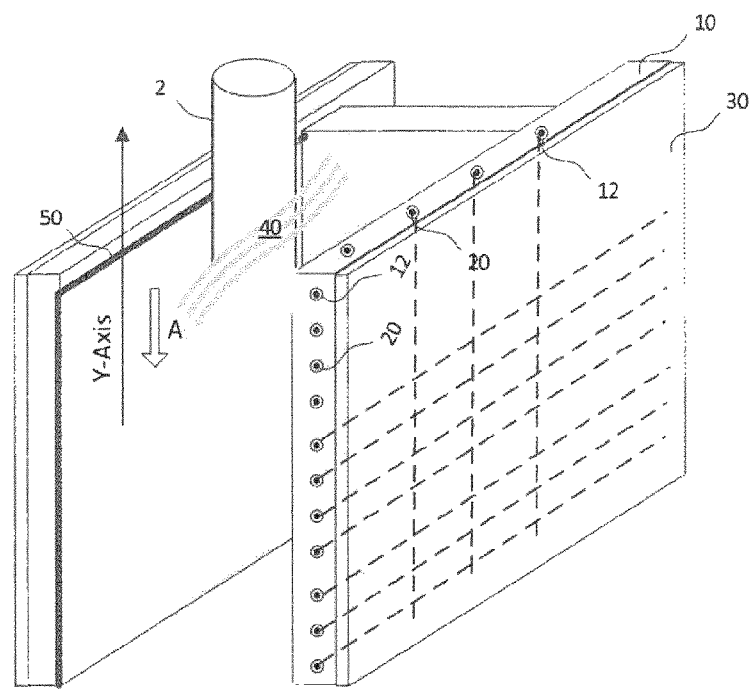
FIG. 1e illustrates a cross-section of a casting mold according to a fourth embodiment of the invention, wherein multiple optical fibers are built-in entire region of the wide side of a copper plate in a meshed manner.

A further alternative embodiment as shown in FIG. 1e is that holes 12 are arranged in a mesh manner into entire area of the copper plate for housing the optical fibers 20 such that the optical fibers may measure entire region of the copper plate.

In any of the above cases shown in FIGS. 1b-1e, the holes 20 are arranged 5-20 mm, preferably 3-20 mm, in the copper plate from the side facing the molten metal.

Figure 2:
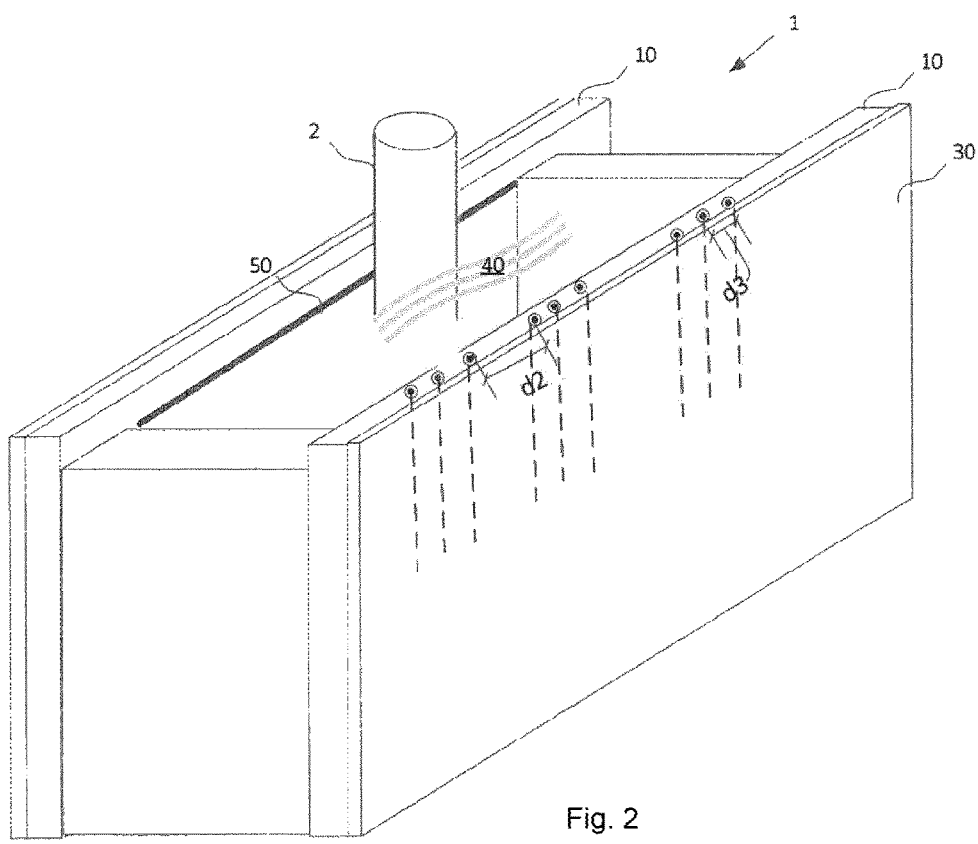
FIG. 2 illustrates a side perspective schematic view of a casting mold, according to a fifth example of the invention, wherein optical fibered are grouped together.
Figure 5:
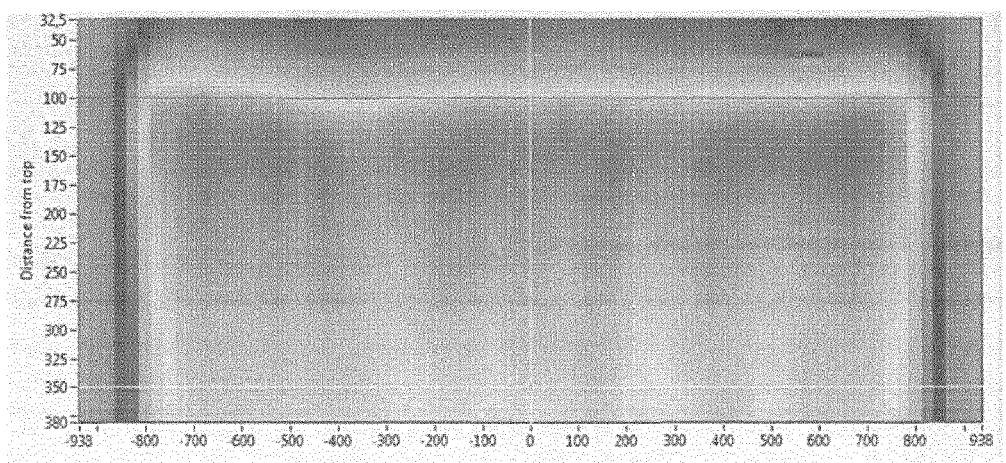
FIG. 5 shows a diagram of measured temperatures of a mold copper plate.

With reference to FIG. 2, each of the holes 12 has a diameter d1 of 0.3-1.2 mm. It is advantageous that a hole is constructed within this range since a small hole has a small impact on the strength of the mold copper plate on one hand. On the other hand, a time constant for temperature variation depends on diameters of optical fibers and holes. The small diameter of a hole provides a short time constant and a faster detection time for temperature variations of the copper plate. The holes 20 may be further grouped and a distance d2 between two groups is in a range of 100-400 mm preferably 150-400 mm depending the dimension of the mold. FIG. 5 shows a diagram of measured temperatures in a copper plate for a slab having a wide side width of 1600 mm, the middle/center of the mold where the nozzle is placed and two points in between. The X-axis of the diagram is a distance from middle/center of the mold and the Y-axis shows the distance from top of the copper plate. The spatial temperature variations occur particularly at the upper part of the copper plate. Thus, by placing the optical fibers in this area, the temperature variations will be captured. A distance d3 between two holes in the same group is in a range 10-100 mm, preferably 50-80 mm, in order to capture spatial variations of the thermal distribution of the molten metal. The arrangement of the optical fibers in groups provides better local resolutions and sensor point densities in particular regions of the copper plate where the casting conditions create domains requiring extra attention in terms of thermal monitoring.

By grouping the optical fibers into groups and arranging the groups with distances, a total amount of the temperature measuring points may reach at least 500 or alternatively 1500 thus to achieve a high resolution. For achieving even higher temperature and position measuring resolution, a total amount of the temperature measuring points of at least 3000 may be arranged so that even high temperature and position accuracy can be achieved.

The optical fibers 20 shown in FIGS. 1b-1d and 2 may be further connected to a temperature analysis unit, from which a broadband light is guided into the optical fibers 20. The temperatures of the measuring/sensing points along each optical fiber may be determined by well-known analysis methods, for example, the Fiber Bragg Grating method or FBG method in short). The principal of the method may be found in US 2011/0167905 A1. As it described, the detailed design of Fiber Bragg Gratings analysis method is widely known. The local measurement resolution is a function of the spacing of the grated measuring/sensing points. The analysis methods used on the FBG's may be OFDR (Optical Frequency Domain Reflectometry) or OTDR (Optical Time Domain Reflectometry). By analyzing the measured temperatures, the casting process can be better monitored by a thermal image of the especially interesting near-meniscus area in the mold. Further applications of the measured and analyzed temperatures can be identification of mechanical stresses in the solidifying shell and heat fluxes in the copper plate.

Although FIGS. 1b-1e and 2 illustrate that optical fibers are arranged inside one copper plate of the mold, it should be understood that it is possible to arrange them into other copper plates of the mold to achieve high measurement resolution around the perimeter of the entire mold.

Figure 4:
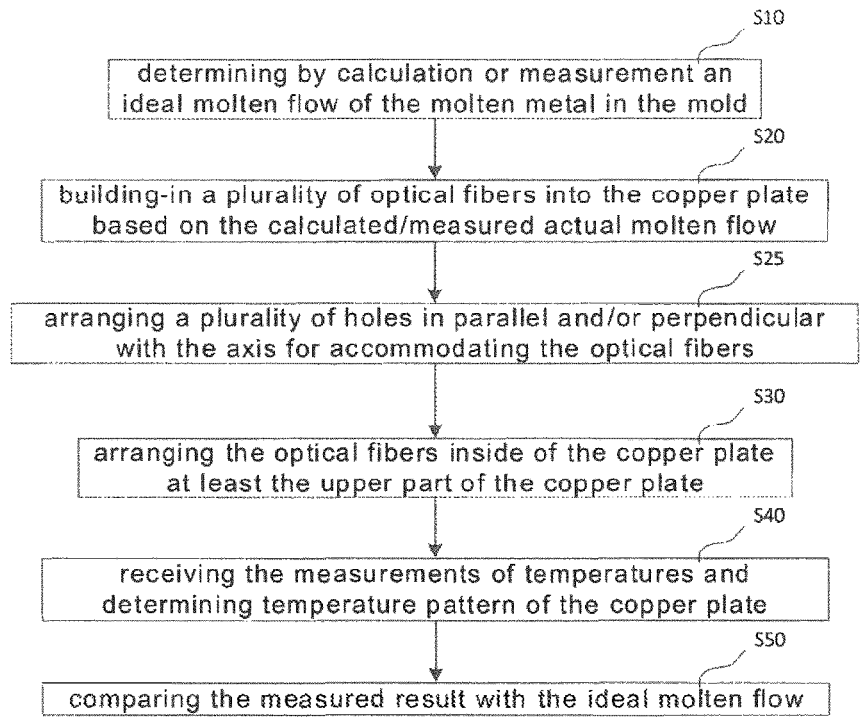
FIG. 4 shows a flow chart of detecting a temperature distribution a molten metal, according to an embodiment of the invention.

FIG. 4 shows a flow chart of detecting temperature distribution of a molten metal in a casting mold having at least one copper plate, which comprises determining by calculation or measurement an ideal molten flow of the molten metal in the mold (S10), building-in a plurality of optical fibers into the copper plate based on the calculated/measured actual molten flow (S20), arranging the optical fibers inside of the copper plate at least the upper part of the copper plate (S30), receiving the measurements of temperatures (S40), and comparing the measurements of temperatures with a calculated/measured distribution of an ideal molten flow during ideal conditions (S50). In this way the temperature distribution in the top region of the copper plate, and the correlating molten metal fingerprint, can be determined based on the measurements of temperatures and can be compared to the ideal flow pattern.

Figure 6A:
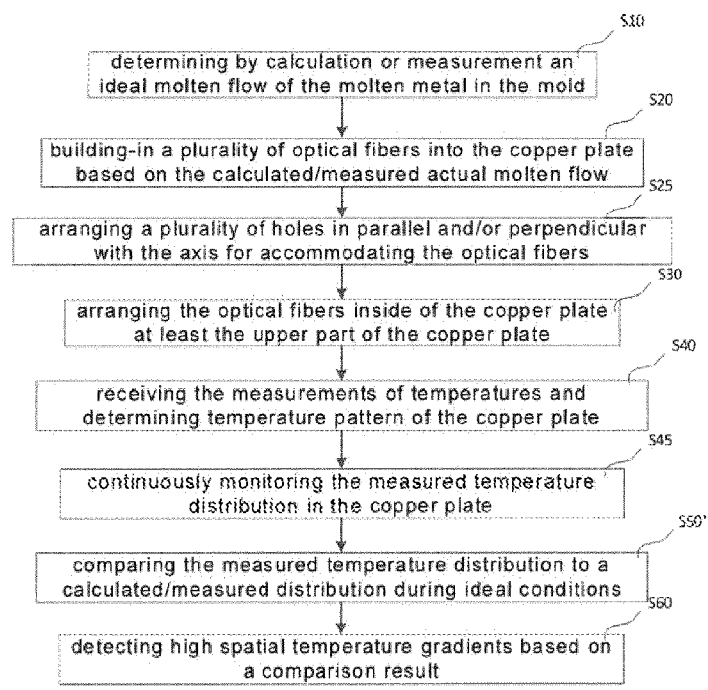
FIG. 6a shows a flow chart of detecting local temperature deviations, according to another embodiment of the invention.
Figure 6B:
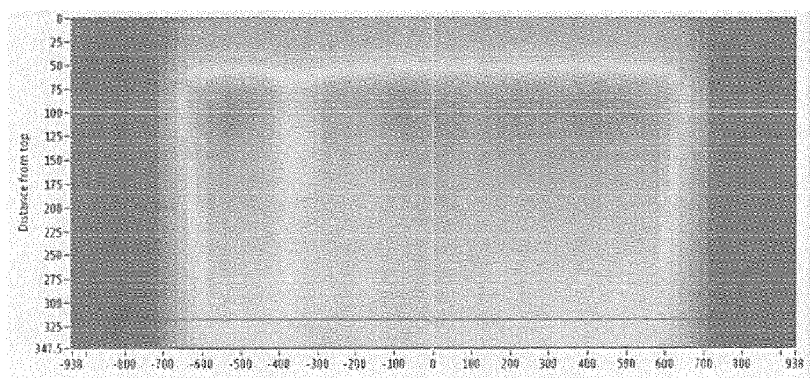
FIG. 6b shows a diagram of measured temperatures of a mold copper plate during local temperature deviation.

FIG. 6a shows a flow chart of detecting local temperature deviations in the solidified metal shell, according to another embodiment of the invention, wherein the method further comprises continuously monitoring the measured temperature distribution in the copper plate (S45), comparing the measured temperature distribution to a calculated and/or measured distribution during ideal conditions (S50'), and detecting high spatial temperature gradients based on a comparison result (S60). Such a hot- or cold-spot could indicate a sticker, break-out risk or crack with large consequences for slab quality and casting process safety. The spatial temperature gradients are evaluated in both vertical and horizontal directions, and gradients with up to but not restricted by 0.4-5 K/mm can be detected. FIG. 6b shows a diagram of measured temperatures of a mold copper plate during local temperature deviation. The lightly colored vertical streak positioned at −400 mm shows a local cold region of the mold potentially caused by the reduced heat transfer from the strand to the mold at a position of a longitudinal shell crack. The indicated low temperature streak is surrounded by strong temperature gradients in the horizontal direction on the left and right sides.

Figure 7A:
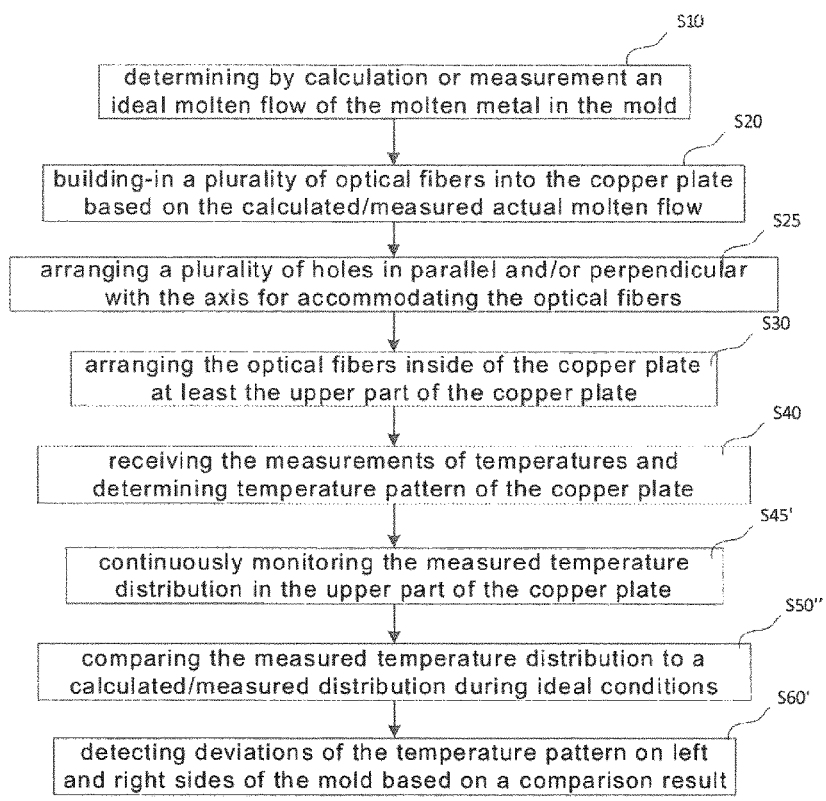
FIG. 7a shows a flow chart of monitoring temperature of a casting mold, according to a further embodiment of the invention.

FIG. 7a shows a flow chart of detecting deviations of the temperature pattern on left and right sides of the mold based on a comparison result, according to a further embodiment of the invention, wherein the method comprises continuously monitoring the measured temperature distribution in the upper part of the copper plate (S45'), comparing the measured temperature distribution to a calculated/measured distribution during ideal conditions (S50"), and detecting deviations of the temperature pattern on left and right sides of the mold based on a comparison result (S60). In this way, a flow asymmetry can be detected. Such an asymmetry could indicate biased flow caused by nozzle clogging with large consequences on slab quality. A standing wave height of the top molten steel surface of 1-100 mm can be detected.

Figure 7B:
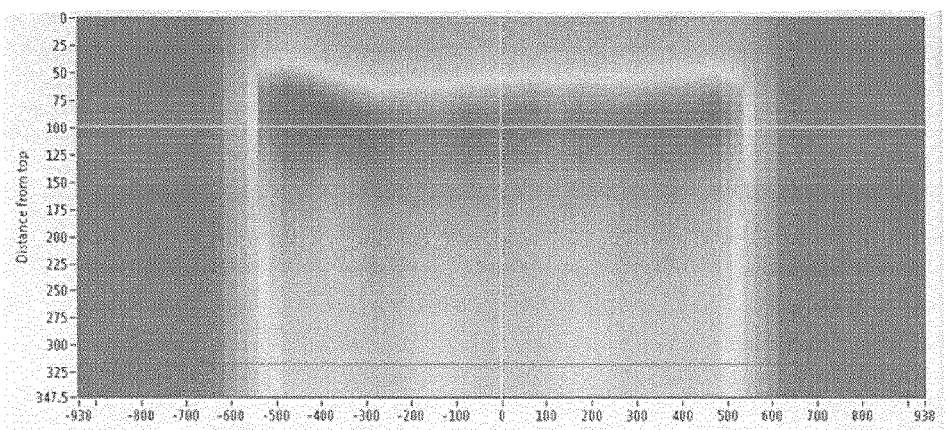
FIG. 7b shows a diagram of measured temperatures of a mold copper plate during biased flow and resulting asymmetry.

FIG. 7b shows a diagram of measured temperatures of a mold copper plate during biased flow and resulting asymmetry. The wave crest 50 mm from the top on the left side at −500 mm shows a much more pronounced meniscus wave than on the right side of the mold. This asymmetric meniscus shape is potentially caused by nozzle clogging leading to a much stronger flow on the left side. The difference in standing wave height between left and right sides detects a biased meniscus flow.

The invention claimed is:

1. A casting mold comprising a copper plate and a plurality of optical fibers, each of the optical fibers having a plurality of temperature measuring points arranged for measuring temperature of the copper plate while casting, wherein a molten metal is cast into the casting mold along an axis, wherein the optical fibers are built-in the copper plate and are arranged at least the upper part of the copper plate, wherein a plurality of holes are arranged in parallel and/or perpendicular with the axis for accommodating the optical fibers, characterized in that the holes accommodating the optical fibers are grouped and a distance between two groups is in a range of 100-400 mm.

2. The casting mold of claim 1, wherein the optical fibers are arranged into at least the upper 300 mm of the copper plate.

3. The casting mold of claim 1, wherein the optical fibers are arranged into the entire wide side and at least the upper 400 mm of the copper plate.

4. The casting mold of claim 1, wherein the optical fibers are arranged into the entire area of the copper plate.

5. The casting mold of claim 1, wherein each of the holes has a diameter of 0.3-1.2 mm.

6. The casting mold of claim 1, wherein a distance between two holes in the same group is in a range 10-100 mm.

7. The casting mold of claim 1, wherein a total amount of the temperature measuring points is at least 500.

8. The casting mold of claim 1, wherein a total amount of the temperature measuring points is at least 1500.

9. The casting mold of claim 1, wherein a total amount of the temperature measuring points is at least 3000.

* * * * *